(12) United States Patent
Han et al.

(10) Patent No.: US 8,980,461 B2
(45) Date of Patent: Mar. 17, 2015

(54) SEPARATOR FOR LITHIUM SECONDARY BATTERY AND LITHIUM SECONDARY BATTERY INCLUDING THE SAME

(75) Inventors: Seonghoon Han, Yongin-si (KR); Changbum Ahn, Yongin-si (KR)

(73) Assignee: Samsung SDI Co., Ltd. (KR)

(*) Notice: Subject to any disclaimer, the term of this patent is extended or adjusted under 35 U.S.C. 154(b) by 0 days.

(21) Appl. No.: 13/101,088

(22) Filed: May 4, 2011

(65) Prior Publication Data
US 2012/0202104 A1    Aug. 9, 2012

Related U.S. Application Data

(60) Provisional application No. 61/439,300, filed on Feb. 3, 2011.

(51) Int. Cl.
| | | |
|---|---|---|
| *H01M 2/16* | (2006.01) | |
| *H01M 10/0525* | (2010.01) | |
| *H01M 4/587* | (2010.01) | |
| *H01M 4/525* | (2010.01) | |

(52) U.S. Cl.
CPC .......... *H01M 2/1646* (2013.01); *H01M 2/1686* (2013.01); *H01M 4/587* (2013.01); *H01M 4/525* (2013.01); *H01M 10/0525* (2013.01); *Y02E 60/122* (2013.01); *Y02T 10/7011* (2013.01)
USPC ....... 429/145; 429/129; 429/251; 429/231.95

(58) Field of Classification Search
CPC ........................................................ H01M 2/16
USPC .............................. 429/145, 129, 251, 231.95
See application file for complete search history.

(56) References Cited

U.S. PATENT DOCUMENTS

| | | | |
|---|---|---|---|
| 4,734,324 A * | 3/1988 | Hill ............................ | 428/317.3 |
| 5,731,074 A | 3/1998 | Nishiyama et al. | |
| 6,503,657 B1 * | 1/2003 | Takami et al. ........... | 429/231.95 |
| 6,703,161 B2 * | 3/2004 | Zucker .......................... | 429/145 |
| 2001/0051297 A1 * | 12/2001 | Nemoto et al. ................ | 429/129 |
| 2004/0115523 A1 * | 6/2004 | Hommura et al. ............ | 429/144 |
| 2008/0187825 A1 * | 8/2008 | Kawabata et al. ............ | 429/144 |
| 2009/0111025 A1 * | 4/2009 | Lee et al. ...................... | 429/251 |

(Continued)

FOREIGN PATENT DOCUMENTS

| | | | | |
|---|---|---|---|---|
| EP | 336170 A * | 3/1989 | ............. | H01M 2/16 |
| JP | 60000052 A * | 1/1985 | | |
| JP | 60136161 A * | 7/1985 | ............. | H01M 2/16 |

(Continued)

OTHER PUBLICATIONS

Fatou et al, "The crystallization kinetics of low-molecular-weight polyethylene fractions", Polymer, 1990, 31, 890-898, Abstract.*

(Continued)

*Primary Examiner* — Patrick Ryan
*Assistant Examiner* — Alex Usyatinsky
(74) *Attorney, Agent, or Firm* — Knobbe Martens Olson & Bear LLP

(57) ABSTRACT

The present disclosure relates to a separator and a lithium secondary battery including the same. The separator comprises a polyethylene-based powder or a polypropylene-based powder provided on or in the base film, wherein the polyethylene-based powder or the polypropylene-based powder is different from the base film.

15 Claims, 1 Drawing Sheet

(56) References Cited

U.S. PATENT DOCUMENTS

2009/0148761 A1* 6/2009 Kikuchi et al. ............... 429/145
2011/0311856 A1* 12/2011 Matsui et al. ................ 429/145

FOREIGN PATENT DOCUMENTS

| JP | 02-077108 | 3/1990 |
| JP | 05-013062 | 1/1993 |
| JP | 08-244152 | 9/1996 |
| JP | 2002-279956 | 9/2002 |
| JP | 2010-095629 A | 4/2010 |
| KR | 2007-0031297 A | 3/2007 |
| KR | 2008-0037865 A | 5/2008 |
| WO | WO 2010/008003 * 1/2010 |

OTHER PUBLICATIONS

JP 60000052 Abstract (Jan. 5, 1985).*

JP 2002-279956 MT.*

* cited by examiner

SEPARATOR FOR LITHIUM SECONDARY BATTERY AND LITHIUM SECONDARY BATTERY INCLUDING THE SAME

RELATED APPLICATIONS

This application claims the benefit of U.S. Provisional Patent Application No. 61/439,300, filed on Feb. 3, 2011, with the United States Patent and Trademark Office, the disclosure of which is incorporated herein in its entirety by reference.

BACKGROUND

1. Field

The present technology relates generally to a separator which may secure not only safety but also excellent long life span and high voltage properties, and a lithium secondary battery including the same.

2. Description of the Related Technology

Lithium secondary batteries are chargeable and dischargeable. By using the lithium secondary batteries, the operating time may be extended, and it is possible to reduce the weight of products. In the lithium secondary batteries, a high voltage and high battery capacity may be realized. Therefore, they have been used for small-size electronic appliances such as mobile phones, mobile personal computers, etc. as well as for the recent applications to electric vehicles and small motorcycles. Because lithium secondary batteries used for the latter applications are large in size and high in energy capacity, they are subject to stricter safety standards than those of small capacity batteries. Accordingly, there is a need for separators that remain safe even at high temperatures due to the abnormal heat generation of batteries and have excellent long life span and high voltage properties.

However, although conventional polyethylene (PE)-based separators can secure safety by virtue of the shut-down effects due to their lower melting points than those of polypropylene (PP)-based separators, there are limitations such as low durability, short life span and low performance at high voltages due to oxidation at lower voltages than PP-based separators. On the other hand, although PP-based separators can be characterized by high thermal endurance, long life span, and high performance at high voltages, there are limitations that they may be easily torn in one direction due to manufacturing by a dry method which is typically advantageous to mass production processes and for obtaining the desirable characteristics of being elongated in one direction. In addition, safety may be challenged because separator pores would not be easily closed at high temperatures.

SUMMARY

An aspect of the present invention provides a separator which may improve safety and provide excellent long life span and high voltage properties, and a lithium secondary battery including the same.

According to at least one of embodiments, a separator includes a base film of polyethylene or polypropylene; and a polyethylene-based powder or a polypropylene-based powder provided on or in the base film, wherein the polyethylene-based powder or the polypropylene-based powder is different from the base film.

According to an embodiment, the base film is polyethylene and the powder is polypropylene-based.

According to an embodiment, the base film is polypropylene and the powder is polyethylene-based.

According to an embodiment, the base film has pores and the powder has an average diameter that is smaller than the average diameter of the pores.

According to an embodiment, the base film has pores with diameters that are about 1 µm or less.

According to an embodiment, the powder has diameters in the range of about 0.1 µm to about 1 µm.

According to an embodiment, the polypropylene-based powder or the polyethylene-based powder has a molecular weight of about 3000 to about 5000.

According to an embodiment, the separator has a permeability that ranges from about 200 to 300 sec/100 cc.

According to an embodiment, the base film has a surface area and the powder is provided on about 10% to about 30% of the surface area of the base film.

According to an embodiment, the powder is provided on one side of the base film or on two opposing sides of the base film.

According to an embodiment, at least some of the powder is inserted inside pores of the base film.

According to an embodiment, powder is provided on the base film by a coating method comprising: providing a resin of polyethylene or polypropylene; forming a polyethylene base film or polypropylene base film from the resin; applying the polyethylene-based powder or polypropylene-based powder in or on the base film; drying the coated base film; and pulling the film to form pores.

According to an embodiment, powder is provided on the base film by a coating method comprising: providing a resin of polyethylene or polypropylene; forming a polyethylene base film or polypropylene base film from the resin; pulling the film to form pores; wetting the base film with a solvent; applying the polyethylene-based powder or polypropylene-based powder in or on the base film in a melted polymer bath; and drying the coated base film.

According to an embodiment, powder is provided on the base film by a coating method comprising: providing a resin of polyethylene or polypropylene; forming a polyethylene base film or polypropylene base film from the resin; washing out plasticizer from the base film with a solvent; applying the polyethylene-based powder or polypropylene-based powder in or on the base film in a melted polymer bath; drying the coated base film; and pulling the base film to form pores.

According to another embodiment, a lithium secondary battery includes an electrode assembly including a positive electrode, a negative electrode and a separator disposed between the positive electrode and the negative electrode; a can accommodating the electrode assembly and an electrolyte; and a cap assembly that is electrically connected to the positive electrode or the negative electrode of the electrode assembly and that seals an upper end of the can.

BRIEF DESCRIPTION OF THE DRAWINGS

The accompanying drawings are included to provide further understanding of the present disclosure, and are incorporated in and constitute a part of this specification. The drawings illustrate certain embodiments of the present disclosure and, together with the description, serve to explain principles of the present disclosure. In the drawings.

DETAILED DESCRIPTION

Figure 1:
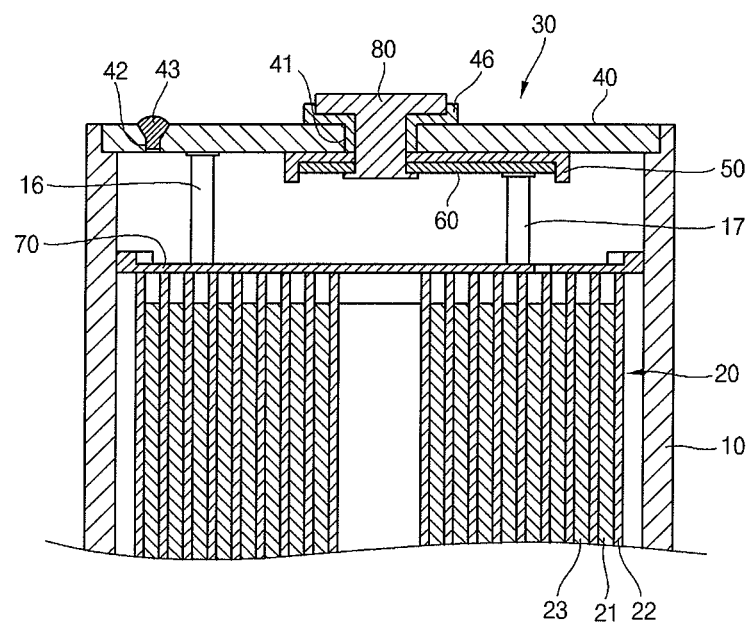
FIG. 1 illustrates a partial cross-sectional view of a lithium secondary battery according to an embodiment.

Certain embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the disclosure to those skilled in the art.

A separator according to an embodiment of the present invention and a lithium secondary battery including the same will be described below in more detail with reference to embodiments.

A separator according to an embodiment of the present invention includes a PP or PE base film; and a layer coated on at least one surface of the base film with a PP-based or PE-based powder that is different from the base film.

Conventional PP-based separators are typically manufactured by a dry method because wet methods have difficulty realizing mass production, so that the pores of these separators are arranged in a longitudinal direction, thus they are weak enough to be easily torn by a minor impact. On the other hand, although typical PE-based separators are manufactured by a wet method and thus may be elongated in multiple directions including lateral and longitudinal directions, their melting points are lower than those of PP-based separators, resulting in low heat resistance. In addition, because the oxidation potential is lower than that of a PP-based separator, there are limitations in terms of the characteristics of life span and high voltage.

Embodiments of the present invention can be characterized by the formation of a layer coated on at least one surface of the PP or PE base film with a powder different from the material of the base film.

Specifically, separators manufactured by an embodiment of the present invention may be classified into those with a layer coated on at least one surface of the PP base film with a PE-based powder (hereinafter, referred to as 'PP/PE-based separator') and others with a layer coated on at least one surface of the PE-based base film with a PP-based powder (hereinafter, referred to as 'PE/PP separator').

Since the PP/PE-based separator does not have any directivity by the PE-based powder layer coated on one surface of the PP base film to inhibit tearing in one direction, defective rates may be reduced. In addition, battery safety may be enhanced because a PE wax can expand and melt when the battery is overcharged as to close the pores of the PP base film and easily shut down the battery. Accordingly, while the separator maintains a long life span and high performances even at high temperatures, which are the advantages of the PP-based separators, the limitations of conventional PP-based separators, for example, low battery safety and high defective rate, may be overcome.

According to an embodiment of the present invention, it is desirable for the PE-based powder to have a melting point lower than that of materials for the PE base film. This is intended to prevent an internal short-circuit of the battery, because the powder may easily melt at high temperatures to close the separator pores. According to an embodiment of the present invention, the PE-based powder may have a molecular weight of about 3,000 to about 5,000. When the molecular weight exceeds 5,000, the melting point increases, which means that the temperature, at which the separator pores may be closed, increases so as to deteriorate the safety. When the molecular weight is less than 3,000, the melting point can become so low that the separator may be oxidized at low temperatures, for example, about 50° C. to about 60° C., resulting in deteriorated storage properties at high temperatures.

The PE/PP-based separator may enhance the heat resistance and the durability of the secondary battery due to an increased melting point by the PP-based powder layer coated on one surface of the PE base film. Accordingly, the life span of the secondary battery employing the PE/PP-based separator may be expanded and used at high voltages, such as 4.3 V or higher. Accordingly, the separator may exhibit a long life span, and high performances at high voltages, and the secondary battery may be afforded advantages in terms of inhibiting internal short-circuits and improving battery safety, which are the advantages of PE-based separators.

According to an embodiment of the present invention, the PP-based powder may have a molecular weight of about 3,000 to about 5,000. When the molecular weight exceeds about 5,000, the melting point increases, which means that the temperature, at which the separator pores may be closed, increases to deteriorate the safety. When the molecular weight is less than about 3,000, the oxidation potential can become so low that the properties of long life span and high performances at high voltage may be deteriorated.

According to an embodiment of the present invention, it is desirable for the powders to have particle diameters less than those of the pores of the base film. When the particle diameters of the powders are larger than those of the base film, the powders may not be inserted inside the pores and accordingly fail to play a complementary role as described above. According to certain embodiments of the present invention, the pores of the base film are about 1 μm or less, and the diameters of the powders are about 0.1 μm to about 1 μm.

According to an embodiment of the present invention, the applied amount of the powder may be controlled in order for the permeability of the separator to be about 200 sec/100 cc to about 300 sec/100 cc. The permeability may be obtained by permeating air in a vertical direction into the surface of a given separator to measure how long it takes for 100 cc of air to be permeated. Since permeability that is too low can result in excessive closure against pores of the base film, the movements of lithium ions may be hindered, resulting in decreased battery capacity and increased resistance, whereas permeability that is too high can result in an insufficient coating that fails to obtain the complementary effects. Accordingly, a separator according to embodiments of the present invention may be prepared by controlling the applied amount of the powder to reach the preferred permeability.

According to an embodiment of the present invention, the powder may be used in an amount of coating about 10% to about 30% based on the surface of the base film. The complementary effects may not be obtained when the amount is reduced to less than about 10%, whereas the powders excessively close the pores on the surface of the base film and the movements of lithium ions are hindered, resulting in decreased battery capacity and increased resistance.

According to an embodiment of the present invention, the powder-coated layer may be formed on one or both sides of the base film. Since separators used on a large scale generally have a thickness of about 10 μm to about 20 μm and a pore size of about 1 μm to about 5 μm, the powders may be sufficiently inserted inside the pores by one-side die coating or spray coating.

The polypropylene powder may be a single polymer, a random copolymer and a block copolymer, and a combination of the one or two may be used. There are no specific limitations on polymerization catalysts, which may include Ziegler-Natta-based or metallocene-based catalysts. In addition, there are no specific limitations on the stereo regularity of polypropylene used. For example, isotactic, syndiotactic and atactic polypropylenes may be used.

The polypropylene powder may be high density, medium density or low density polyethylenes, and a combination of one or two polyethylenes may be used.

According to an embodiment of the present invention, the separator may be manufactured by coating the PP-based or PE-based powder whose composition is different from that of the base film on at least one surface of the PP or PE base film. It is desirable for the powder coating to be formed by a spray method for easier insertion of the powder particles into the pores.

At this time, powder coating can be performed by the methods that have been known to the skilled persons in the related art. According to an embodiment of the present invention, the coating method may include a step of forming a base film, for example, by driving out the PP or PE base film from PP or PE melted resin by T-tie. The coating method may also include a step of coating by applying the PE or PP based powder in or on the base film, for example, by a spray or dot coating in an LDPE~MDPE based melt polymer bath. The coating method may also include a step of drying the film, for example, at 70~90° C. by roll to roll. The coating method may also include a step of elongating (e.g., pulling) the film, for example, in a MD/TD direction, in order to form pores.

In another method according to an embodiment of the present invention, the coating method may include a step of forming the base film, for example, by driving out the PP or PE base film from PP or PE melted resin by T-tie. The coating method may also include a step of elongating (e.g., pulling) the film, for example, in a MD direction in order to form pores. The coating method may also include a step of solvent wetting the base film with solvent, for example acetone/ethanol/methanol/THF of which the boiling points are below about 70° C. to about 90° C., through a deep wetting. The coating method may also include a step of coating by applying a PP or PE based powder in or on the base film, for example, in a LDPE~MDPE based melted polymer bath by a spray or dot coating. The coating method may also include a step of drying the film at about 70° C. to about 90° C. by roll to roll.

In another coating method according an embodiment of the present invention, the coating method may include a step of forming the base film, for example, by driving out the PP or PE base film including a plasticizer from PP or PE melted resin by T-tie. The coating method may also include a step of washing or driving out the plasticizer from the base film with a solvent. The coating method may also include a step of coating by applying PP or PE based powder in or on the base film, for example, in a LDPE~MDPE based melted polymer bath by a spray or dot coating. The coating method may also include a step of drying the film at about 70° C. to about 90° C. by roll to roll; and a step of elongating (e.g., pulling) the base film in a MD/TD direction in order to form pores.

The coating methods are just shown as examples for coating powder on or in a base film. However, the method of using a spray coating may be advantageous because particles of powder can be easier inserted into the pores of the film.

A secondary battery including a separator manufactured according to an embodiment of the present invention will be described below in detail.

FIG. 1 illustrates a partial cross-sectional view of the lithium secondary battery according to an embodiment of the present invention. While a method of manufacturing a lithium secondary battery as described below is provided for the purpose of understanding, it will be understood by those of ordinary skill in the art that various changes may be made without departing from the spirit and scope of the present invention.

Referring to FIG. 1, a lithium secondary battery according to embodiments of the present invention includes a can 10, an electrode assembly 20, a cap assembly 30, and an electrolyte. In the lithium secondary battery, the electrode assembly 20 and electrolyte are accommodated in the can 10, and the cap assembly 30 is formed by sealing a top part of the can.

The electrode assembly 20 may include a positive electrode plate 21, a negative electrode plate 23, and a separator 22. The electrode assembly 20 may be formed by winding the laminated layers after sequentially laminating the positive electrode plate 21, separator 22, and negative electrode plate 23.

The positive electrode plate 21 may be formed by applying a positive electrode active material on the surface of a positive electrode collector. Aluminum, aluminum alloys, and other materials may be used as the positive electrode collector. The positive electrode collector may be formed in the form of a foil or mesh. The mixture may be applied on the surface of the positive electrode collector after preparing a mixture in a slurry state, by dispersing the positive electrode active material into solvent along with a binder and conductive material, and thickening agent if necessary.

The positive electrode active material may be formed of a material into which lithium ions may be reversibly interposed, and from which the lithium ions may be reversibly separated. Examples of the positive electrode active material may include composite metal oxides of lithium and at least one selected from cobalt, manganese, and nickel. The positive electrode active material may additionally include elements selected from the group consisting of Mg, Al, Co, K, Na, Ca, Si, Ti, Sn, V, Ge, Ga, B, As, Zr, Mn, Cr, Fe, Sr, V, and rare earth elements.

The negative electrode plate 23 may be formed by applying a negative electrode active material on the surface of a negative electrode collector. Copper, copper alloys and others may be used as the negative electrode collector. The negative electrode collector may be formed in the form of a foil or mesh. The mixture may be applied on the surface of the negative electrode collector after preparing a mixture in a slurry state by dispersing the negative electrode active material into solvent along with a binder and conductive material, and thickening agent if necessary.

The negative electrode active material may be formed of a material into which lithium ions can be interposed, and from which the lithium ions can be separated. Examples of the negative electrode active material may include carbon-based negative electrode active material of crystalline or amorphous carbon, or carbon composite, burnt organic polymer compound, carbon fiber, tin oxide compound, lithium metal, or alloys of lithium and other elements. Examples of the amorphous carbon may include hard carbon, coke, mesophase pitch-based carbon fiber (MPCF), mesocarbon microbeads (MCMB) baked at 1500° C. or less, and other materials. The crystalline carbon may include graphite-based materials, specifically for example, natural graphite, graphitized coke, graphitized MCMB, graphitized MPCF, and other materials.

Figure 2:
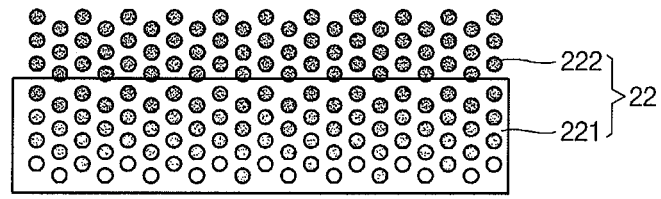
FIG. 2 illustrates a schematic cross-sectional view of a separator according to an embodiment.

The separator 22 may be interposed between the positive electrode plate 21 and negative electrode plate 23 to prevent a short circuit of the positive electrode plate 21 and negative electrode plate 23. Referring to FIG. 2, the separator 22 may include a PP or PE base film 221 and a coating layer 222 coated with a PP-based or PE-based powder whose composition is different from that of the base film 221 and that is applied on at least one surface of the base film 221. The PP-based or PE-based powders present the effect to complement the defects of the base films by being inserted into the pores of the base films 221. Therefore, the composition of the base films 221 is different from that of the powder layers. For examples, when the base film 221 is PE based film, the powder of the coating layer 222 is PP based powder. The other features for the separator 22 are the same as embodiments described above.

The cap assembly 30 may include a cap plate 40, an insulation plate 50, a terminal plate 60, and an electrode terminal 80. The cap assembly 30 may be assembled with an insulation case 70 to seal the can 10.

The electrode terminal 80 may be inserted into a terminal through-hole 41 formed in the center of the cap plate 40. The electrode terminal 80 may be inserted into the terminal through-hole 41 together with the tube type gasket in a state that a tube type gasket 46 is coupled to the outer face of the electrode terminal 80 when inserting the electrode terminal 80 into the terminal through-hole 41. Therefore, the electrode terminal 80 may be electrically insulated with the cap plate 40.

The electrolyte may be injected into the can 10 through an electrolyte injection hole 42 after the cap assembly 30 is assembled onto the top part of the can 10. The electrolyte injection hole 42 may be sealed by a separate stopper 43. The electrode terminal 30 may be connected to a negative electrode tab 17 of the negative electrode plate 23 or a positive electrode tab 16 of the positive electrode plate 21 such that the electrode terminal 80 is operated as a negative terminal or a positive terminal.

On the other hand, the lithium secondary battery can be formed in a unit cell constructed in a structure of positive electrode plate/separator/negative electrode plate, a bi-cell constructed in a structure of positive electrode plate/separator/negative electrode plate/separator/positive electrode plate, or a layer-built cell constructed in such a structure that unit cells are repeated.

Further, a lithium secondary battery of the present invention can be formed in a cylinder type, a pouch type, or other shape besides the illustrated prismatic type.

A separator of the present invention and a lithium secondary battery including the same will be described below in more detail with reference to the following Embodiments and Comparative Examples. However, the following Embodiments are provided for illustrative purposes only, and the scope of the present invention should not be limited thereto in any manner.

Embodiments 1 to 6

A positive electrode active material slurry was prepared by dispersing $LiCoO_2$ as the positive electrode active material, polyvinylidene fluoride (PVdF) as the binder, and carbon as the conductive material into N-methyl-2-pyrrolidone solvent in a weight ratio of 92:4:4. A positive electrode plate was manufactured by coating the positive electrode active material slurry on an aluminum foil with a thickness of 15 μm, drying the positive electrode active material slurry coated on the aluminum foil, and rolling the dried positive electrode active material slurry coated on the aluminum foil.

A negative electrode active material slurry was prepared by mixing graphite as negative electrode active material, styrene-butadiene rubber (SBR) as binder, and carboxymethyl cellulose (CMC) as thickening agent in a weight ratio of 96:2:2, and then dispersing the mixture into water. A negative electrode plate was manufactured by coating the negative electrode active material slurry on a copper foil with a thickness of 10 μm, drying the negative electrode active material slurry coated on the copper foil, and rolling the dried negative electrode active material slurry coated on the copper foil.

A base film with a thickness of 12 μm was put in LDPE~MDPE based melted polymer bath and then coated with powder by a spray method. At coating, the polymer bath was controlled in a manner that the amount of the polymer was 20 weight % of the base film. The powder coated film was dried at 80~90° C. by using a roll to roll method. The dried film was elongated in MD/TD direction to form pores.

A powder was applied on the base film with a thickness of 12 μm by using a spray to form a coating layer which accounted for about 20% based on the total surface area of the base film. The base films and powders used are as described in Table 1.

The separator manufactured was interposed between the positive and negative electrode plates to form an electrode assembly. The electrode assembly was wound and then inserted into a prismatic type can having dimensions of 46 mm×34 mm×50 mm. An electrolyte was injected into the can to manufacture a lithium secondary battery.

The electrolyte was prepared by mixing 1.0 M of $LiPF_6$ with a solvent mixture of ethylene carbonate (EC) and methylethtyle carbonate (MEC) in weight ratio of 3:7.

COMPARATIVE EXAMPLES 1 TO 10

Lithium secondary batteries were manufactured in the same method as in Embodiment 1, except that the separators were prepared as shown in the following Table 1.

EXPERIMENTAL EXAMPLE 1

Tearing in One Direction

The TD tensile strengths of the separators prepared according to Embodiments and Comparative Examples were measured and shown in Table 1 according to the following criteria.

⊚: 1000 kgf/cm²≤TD
○: 750 kgf/cm²≤TD<1000 kgf/cm²
Δ: 500 kgf/cm²≤TD<750 kgf/cm²
X; TD<500 kgf/cm²

EXPERIMENTAL EXAMPLE 2

Safety Evaluation

For a lithium secondary battery manufactured according to Embodiments and Comparative Examples, a short circuit was evaluated after they were exposed at 150° C. for 10 min.

The state of a lithium secondary battery manufactured according to Embodiments and Comparative Examples was observed after the battery was charged at 3 c-rate until 10 V. One of the following signals:
☐: LEAK
○: SMOKE, <200☐
☐: SMOKE, >200☐
X: FIRE was marked according to the state of the battery.

EXPERIMENTAL EXAMPLE 3

Storage Properties at High Temperatures

The capacity of a lithium secondary battery manufactured according to Embodiments and Comparative Examples was measured after the battery was stored at 60° C. for a long period of 30 days, and marked as follows according to the capacity of the battery.
☐: 80% of the initial battery capacity≤battery capacity
○: 70% of the initial battery capacity≤battery capacity<80% of the initial battery capacity Δ: 60% of the initial battery capacity≤battery capacity<70% of the initial battery capacity
X: battery capacity<60% of the initial battery capacity

EXPERIMENTAL EXAMPLE 4

Long Life Span Properties

After conducting 3000 respective cycles of charging and discharging a lithium secondary battery manufactured according to Embodiments and Comparative Examples, the capacity of the battery was measured and each marked according to the criteria of Experimental Example 3.

The experimental results are shown in Table 1.

particle diameters could also not obtain the effects of forming a powder-coated layer as in the single layer film.

In addition, the secondary battery in Comparative Example 5, which used a powder having too small a molecular weight, had a low melting point, resulting in limitations in high-temperature storage, while the secondary battery of Comparative Example 6, which used a powder having too large a molecular weight, had a high melting point, resulting in limitations in safety and high-temperature short-circuit in the case of overcharging.

Further, the secondary battery of Comparative Example 7, which used PP powder having too small a molecular weight, did not fully exhibit the PP properties, and lowered the melting point resulting in inability to prevent heat contraction at

TABLE 1

| | Powder | | | Properties | | | | |
|---|---|---|---|---|---|---|---|---|
| | Base separator | Type | Average particle diameter (μm) | Tearing in one direction | Exposure to heat [1] | Over-charging Effects | of high-temperature storage at 60° C. [2] | 3000 cycles long life span (Deterioration) |
| Embodiment 1 | PP | PE 3000~5000 | 0.1 | ⊚ | ⊚ | ⊚ | ⊚ | ⊚ |
| Embodiment 2 | PP | PE 3000~5000 | 0.5 | ○ | ○ | ○ | ○ | ○ |
| Embodiment 3 | PP | PE 3000~5000 | 1 | ○ | ○ | ○ | ○ | ○ |
| Embodiment 4 | PE | PP 3000~5000 | 0.1 | ○ | ○ | ○ | ○ | ○ |
| Embodiment 5 | PE | PP 3000~5000 | 0.5 | ⊚ | ○ | ○ | ○ | ○ |
| Embodiment 6 | PE | PP 3000~5000 | 1 | ⊚ | ⊚ | ⊚ | ○ | ○ |
| Comparative Example 1 | PP single layer | — | — | X | Δ | Δ | ○ | ○ |
| Comparative Example 2 | PE single layer | — | — | ○ | Δ | Δ | ○ | X |
| Comparative Example 3 | PP | PE 3000~5000 | 1.5 | X | Δ | Δ | ○ | ○ |
| Comparative Example 4 | PE | PP 3000~5000 | 1.5 | ○ | Δ | Δ | ○ | X |
| Comparative Example 5 | PP | PE MWt 2000 | 0.5 | ○ | Δ | Δ | X | ○ |
| Comparative Example 6 | PP | PE MWt 6000 | 0.5 | ○ | Δ | Δ | ○ | ○ |
| Comparative Example 7 | PE | PP MWt 2000 | 0.5 | ○ | X | X | ○ | X |
| Comparative Example 8 | PE | PP MWt 6000 | 0.5 | ○ | Δ | Δ | ○ | X |
| Comparative Example 9 | PE | PP MWt 3000~5000 | 0.05 | ○ | Δ | Δ | ○ | Δ |
| Comparative Example 10 | PE | PE MWt 3000~5000 | 0.05 | ○ | Δ | Δ | ○ | Δ |

[1] high-temperature short-circuit
[2] recovery capacity after leaving the battery at 60° C. for a month after charging.

It may be shown from Table 1 that a lithium secondary battery manufactured according to Experimental Examples 1 to 6 show excellent properties in terms of tearing in one direction, high-temperature short-circuit, overcharging effects, long life span, and high-temperature storage. Therefore, it may be understood that a separator according to embodiments of the present invention and a secondary battery including the same not only improves battery safety but also provide excellent properties in heat resistance, long life span and high-temperature storage.

However, the secondary batteries in Comparative Examples 1 and 2, which are composed of a single layer of PP-based film or PE-based film could not overcome respective limitations. The secondary batteries of Comparative Examples 3 and 4, which used powders having large average high temperatures, while the secondary battery of Comparative Example 8, which used PP powder having too large a molecular weight, increased the melting point, closing pores at high temperatures to induce a short-circuit and thus deteriorating safety at high temperatures.

Further, the secondary batteries of Comparative Examples 9 and 10, which used PP or PE based powders having small average particle diameters, present relative low performance in safety and high-temperature short-circuit in the case of overcharging.

Since a separator according to embodiments of the present invention and a lithium secondary battery including the same may not only overcome the limitations of PP-based and PE-based separators but also maintain the advantages of the respective separators, the battery safety, especially safety at high temperatures, is improved and properties of long life span and high voltage are excellent.

In particular, production cost may be lowered by forming a layer coated with a powder different from material of the base film, compared to batteries in a sheet form manufactured by simply mixing heterogeneous ingredients or those with heterogeneous films stacked with each other.

Moreover, as a layer is formed by coating a powder on a base film, a constant performance may be exhibited regardless of the coatability, compared to batteries with heterogeneous ingredients mixed and directly coated on the electrode plates.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A separator for a secondary battery comprising:
a base film consisting of polyethylene or polypropylene, the base film comprising a plurality of pores therein; and
material applied onto the base film, wherein at least part of the material is inserted into at least part of the plurality of pores, wherein the material consists of polyethylene when the base film is polypropylene, wherein the material consists of polypropylene when the base film is polyethylene, and wherein the base film has a surface area and the material is provided on about 10% to about 30% of the surface area of the base film.

2. The separator of claim 1, wherein the polypropylene of the polypropylene material has a molecular weight of about 3,000 to about 5,000, and wherein the polyethylene of the polyethylene material has a molecular weight of about 3,000 to about 5,000.

3. The separator of claim 1, wherein the base film has pores having an average diameter, and the material comprises particles having an average diameter that is smaller than the average diameter of the pores of the base film.

4. The separator of claim 1, wherein the base film has pores having diameters that are about 1 μm or less.

5. The separator of claim 4, wherein the material comprises particles having diameters in the range of about 0.1 μm to about 1 μm.

6. The separator of claim 1, wherein the separator has a permeability that ranges from about 200 sec/100 cc to about 300 sec/100 cc.

7. The separator of claim 1, wherein the material is provided on one side of the base film or on two opposing sides of the base film.

8. The separator of claim 1, wherein at least some particles of the material are inserted inside pores of the base film.

9. A method of forming the separator for a secondary battery of claim 1, the method comprising:
applying powder to a polyethylene or polypropylene base film such that the powder is provided on or in the base film to provide a coated base film, wherein the powder consists of polyethylene or polypropylene particles, wherein when the powder consists of polyethylene particles, the base film is of polypropylene, wherein when the powder consists of polypropylene particles, the base film is of polyethylene.

10. The method of claim 9, wherein the amount of powder that is applied is controlled so that the permeability of the separator is from about 200 sec/100 cc to about 300 sec/100 cc.

11. The method of claim 9, wherein the base film has a surface area and the powder is provided on about 10% to about 30% of the surface area of the base film.

12. The method of claim 9, wherein applying powder to a polyethylene or polypropylene base film comprises:
providing a resin of polyethylene or polypropylene;
forming the polyethylene base film or polypropylene base film from the resin;
applying the powder onto a surface of the base film to provide a coated base film;
drying the coated base film; and
pulling the film to form pores.

13. The method of claim 9, wherein applying powder to a polyethylene or polypropylene base film comprises:
providing a resin of polyethylene or polypropylene;
forming a base film of polyethylene or polypropylene from the resin;
pulling the base film to form pores;
wetting the base film with a solvent;
forming the coated based film by applying the powder in or on the base film in a melted polymer bath; and
drying the coated base film.

14. The method of claim 9, wherein applying powder to a polyethylene or polypropylene base film comprises:
providing a resin of polyethylene or polypropylene;
forming a base film of polyethylene or polypropylene from the resin;
washing out plasticizer from the base film with a solvent;
forming the coated based film by applying the powder in or on the base film in a melted polymer bath;
drying the coated base film; and
pulling the coated base film to form pores.

15. A secondary battery comprising:
an electrode assembly comprising a first electrode, a second electrode, and the separator of claim 1 interposed between the first and second electrodes.

* * * * *

UNITED STATES PATENT AND TRADEMARK OFFICE
CERTIFICATE OF CORRECTION

PATENT NO.        : 8,980,461 B2  
APPLICATION NO.   : 13/101088  
DATED             : March 17, 2015  
INVENTOR(S)       : Han et al.

Page 1 of 1

It is certified that error appears in the above-identified patent and that said Letters Patent is hereby corrected as shown below:

In the Specification

In column 8 at lines 19-20, Change "methylethtyle" to --methylethyl--.

Signed and Sealed this
Second Day of February, 2016

Michelle K. Lee
*Director of the United States Patent and Trademark Office*